(12) United States Patent
Thurgate et al.

(10) Patent No.: US 10,836,239 B2
(45) Date of Patent: Nov. 17, 2020

(54) VEHICLE PANELS INCLUDING INTEGRALLY FORMED ALIGNMENT RIBS FOR INHIBITING ROTATION OF VEHICLE COMPONENTS

(71) Applicant: Toyota Motor Engineering & Manufacturing North America, Inc., Plano, TX (US)

(72) Inventors: Brian T. Thurgate, Ypsilanti, MI (US); William Hardy, Tecumseh, MI (US); Kevin O'Beirne, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 50 days.

(21) Appl. No.: 16/240,200

(22) Filed: Jan. 4, 2019

(65) Prior Publication Data

US 2020/0215885 A1    Jul. 9, 2020

(51) Int. Cl.
   *B60J 5/04*    (2006.01)
   *E05F 5/02*    (2006.01)
   *B60J 5/10*    (2006.01)

(52) U.S. Cl.
   CPC .......... *B60J 5/0463* (2013.01); *B60J 5/0468* (2013.01); *B60J 5/107* (2013.01); *E05F 5/025* (2013.01)

(58) Field of Classification Search
   CPC . B60J 5/0463; B60J 5/0468; B60J 5/10; B60J 5/101; B60J 5/102; B60J 5/107; B62D 65/06; E05F 5/025
   USPC ........................................................ 296/207
   See application file for complete search history.

(56) References Cited

U.S. PATENT DOCUMENTS

| | | | | |
|---|---|---|---|---|
| 1,729,231 | A * | 9/1929 | Toncray | ................... E05F 5/025 16/86 B |
| 5,421,124 | A * | 6/1995 | Zuccaro | ................... B60J 5/108 16/DIG. 6 |
| 7,014,258 | B2 * | 3/2006 | Schubring | .................. B60J 5/10 292/216 |
| 7,308,731 | B2 * | 12/2007 | Schubring | ............... E05F 5/022 16/86 R |
| 2007/0248435 | A1 | 10/2007 | Hirotomi | |

FOREIGN PATENT DOCUMENTS

WO    WO-2013093265 A1 *    6/2013    ........... E05B 84/045

* cited by examiner

*Primary Examiner* — Jason S Daniels
(74) *Attorney, Agent, or Firm* — Dinsmore & Shohl LLP

(57) ABSTRACT

A method of installing a vehicle component to a vehicle panel is provided. The method includes aligning a fastening opening of the vehicle component with a fastening opening through the vehicle panel. The vehicle component abuts against an alignment rib that is formed integrally with the vehicle panel. A fastener is inserted through the fastening openings of the vehicle component and the vehicle panel. The fastener is tightened while the alignment rib inhibits rotation of the vehicle component.

13 Claims, 4 Drawing Sheets

VEHICLE PANELS INCLUDING INTEGRALLY FORMED ALIGNMENT RIBS FOR INHIBITING ROTATION OF VEHICLE COMPONENTS

TECHNICAL FIELD

The present specification generally relates to vehicle panels, and more specifically, vehicle panels including integrally formed alignment ribs for inhibiting rotation of vehicle components during installation.

BACKGROUND

Vehicles have a number of components that are attached to vehicle panels during assembly of the vehicles. For example, brackets may be connected to a shut face panel of a vehicle door assembly. These brackets may be used to align the vehicle door assemblies as the vehicle door assemblies are moved from an open position to a closed position. Installation of these brackets can be somewhat cumbersome, particularly for brackets that have multiple fastening locations. In some installation operations, for example, the installer may loosely tighten one fastener at one installation location, leave that installation location and move to a next installation location to tighten another fastener, only to return to the first fastener to complete tightening. The first fastening location is left loose so that the second fastening location can be aligned to the desired location of the shut face panel.

Accordingly, a need exists for vehicle panels including integrally formed alignment ribs for inhibiting rotation of fastening members during installation.

SUMMARY

In one embodiment, a method of installing a vehicle component to a vehicle panel is provided. The method includes aligning a fastening opening of the vehicle component with a fastening opening through the vehicle panel. The vehicle component abuts against an alignment rib that is formed integrally with the vehicle panel. A fastener is inserted through the fastening openings of the vehicle component and the vehicle panel. The fastener is tightened while the alignment rib inhibits rotation of the vehicle component.

In another embodiment, a vehicle includes a vehicle door assembly including an outer panel and an inner panel connected to the outer panel. A shut face panel spans a gap between the outer panel and the inner panel. The shut face panel includes an alignment rib that is formed integrally with the shut face panel. A stopper component is mounted to the shut face panel using a fastening opening that extends through the shut face panel. The stopper component includes a fastening opening that is aligned with the fastening opening of the shut face panel with the stopper component abutting against the alignment rib.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include vehicle panels that include integrally formed alignment ribs that inhibit rotation of vehicle components when fastened to the vehicle panels. The alignment ribs may be formed of material that forms the vehicle panel, such as by integrally molding the alignment ribs during formation of the vehicle panels. The alignment ribs can be formed to abut the vehicle components and inhibit rotation of the vehicle components during fastening of the vehicle components to the vehicle panels. The alignment ribs can also be used to align the vehicle components in a desired orientation during the installation operation and reduce a number of steps needed to complete installation of the vehicle components.

Figure 1:
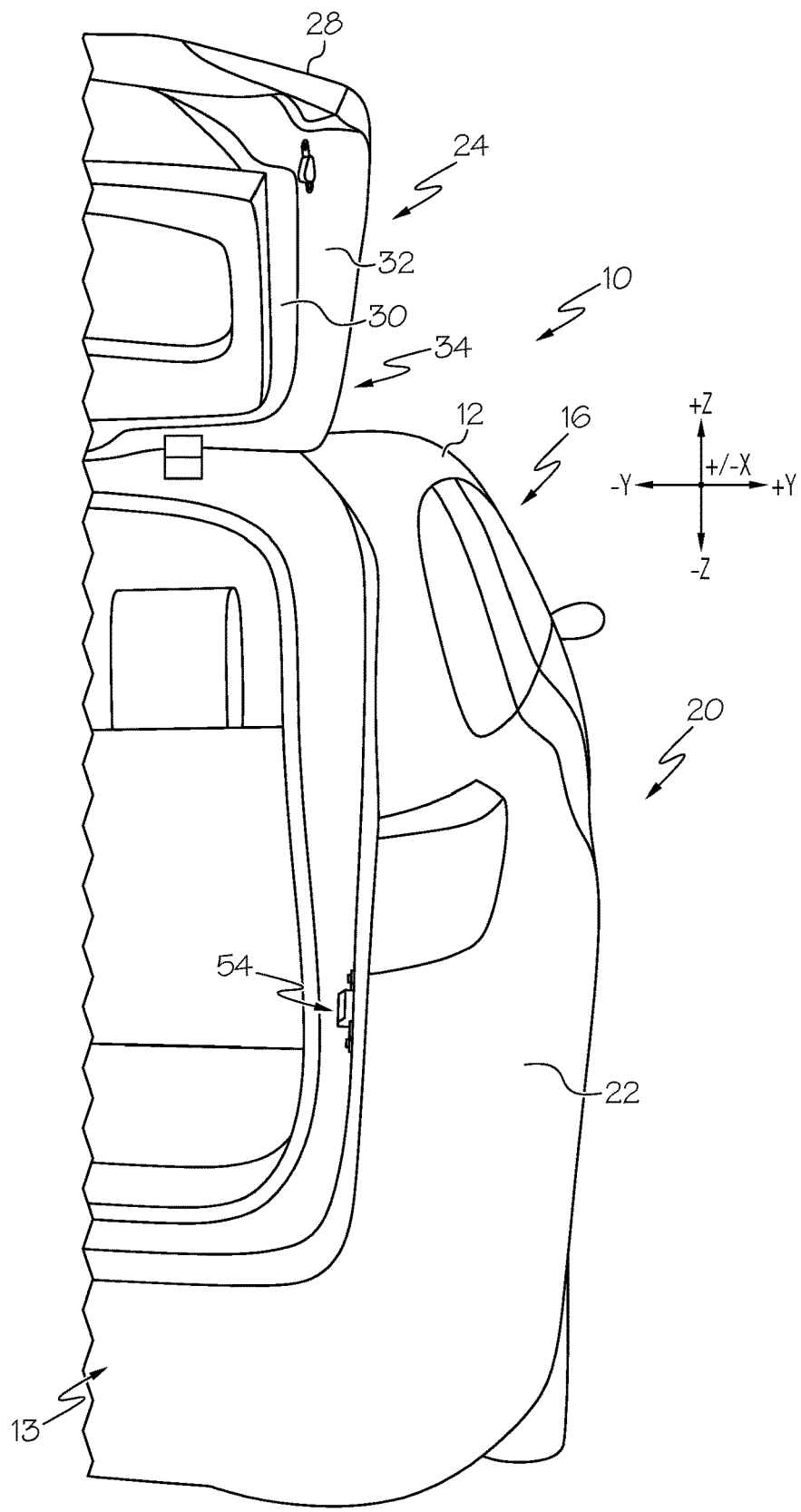
FIG. 1 schematically depicts a perspective view of a vehicle including a vehicle door assembly, according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle 10.

The vehicle 10 includes a vehicle body 12 including a body framework and having a front 16, a rear 18 and sides 20 that extend between the front 16 and the rear 18. The vehicle 10 includes a rear end assembly 22 at the rear 18 of the vehicle body 12. The rear end assembly 22 includes a vehicle door assembly 24 that is rotatably connected to the vehicle body 12 using hinges 26.

Motor vehicles that incorporate elements according to the present disclosure may include a variety of construction methodologies that are conventionally known, including a unibody construction methodology as well as a body-on-frame construction methodology. Furthermore, the Figures may only show one side of the vehicle. Descriptions of the other side of the vehicle may be omitted because both sides of the vehicle may be laterally symmetrical and substantially the same.

Figure 2:
FIG. 2 schematically depicts a more detailed view of the vehicle door assembly of FIG. 1 including a shut face panel with an alignment rib and a stopper component, according to one or more embodiments shown and described herein.

Referring also to FIG. 2, the vehicle door assembly 24 includes an outer panel 28 and an inner panel 30 that is spaced from the outer panel 28 in the vehicle longitudinal direction with the vehicle door assembly 24 in a closed position. A shut face panel 32 extends between the outer panel 28 and the inner panel 30 at a side 34 of the vehicle door assembly 24. The shut face panel 32 may be a monolithic and integral part of the inner panel 30. As with the inner panel 30, the shut face panel 32 may be formed of a plastic material, such as by molding the shut face panel 32.

Figure 3:
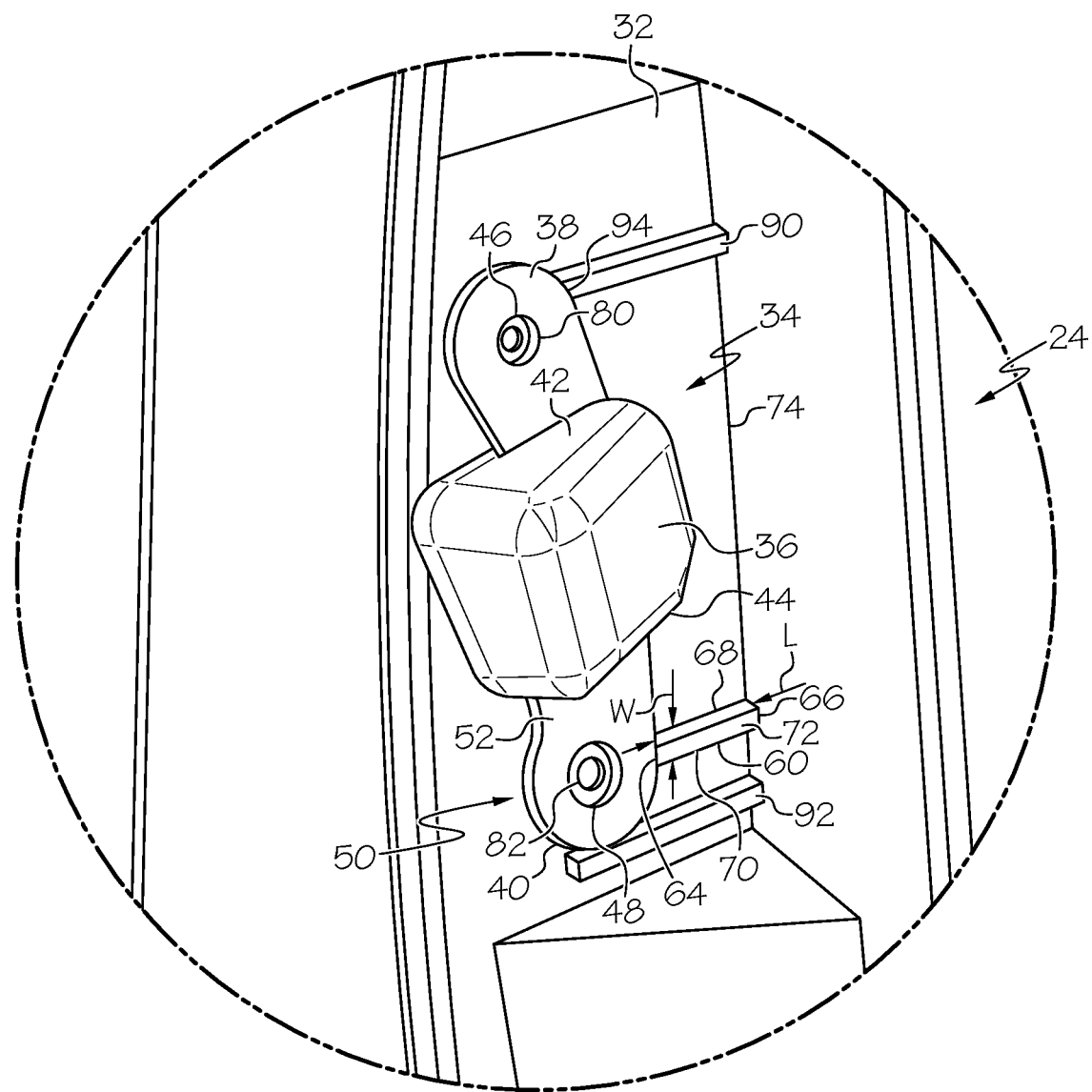
FIG. 3 schematically depicts and even more detailed view of the vehicle door assembly of FIG. 2 including the shut face panel with alignment rib and stopper component, according to one or more embodiments shown and described herein.

Referring to FIG. 3, a stopper component 34 includes a stopper body 36 and flanges 38 and 40 that extend outward from the stopper body 36 at opposite sides 42 and 44. In some embodiments, the stopper body 36 may be formed of an elastic material, such as a plastic or rubber. The flanges 38 and 40 may be formed of a different material, such as a metal and have fastening openings 46 and 48 extending therethrough to provide fastening locations where the stopper component 34 can be fastened to the shut face panel 32. In some embodiments, the flanges 38 and 40 are provided by a bracket 50 having a somewhat curved body 52 onto which the stopper body 36 is provided. For example, the stopper body 36 may be overmolded onto the curved body 52. In other embodiments, the stopper body 36 may be adhered onto the curved body 52. As can be seen the stopper body 36 provides the stopper component 34 with an increased thickness that mates with a corresponding stopper component 54 located on a shut face panel 56 of the vehicle body 12 (FIG. 1). The stopper body 36 provides alignment of the vehicle door assembly 24 as it returns to a closed position, while also providing damping to reduce shock as the vehicle door assembly 24 closes against the vehicle body 12.

An alignment rib 60 is provided on the shut face panel 32. In particular, the alignment rib 60 is integrally formed with the shut face panel 32 such that the alignment rib 60 extends outwardly from a surface of the shut face panel 32 in the vehicle lateral direction. In the illustrated embodiment, the alignment rib 60 is box-shaped having opposite ends 64 and 66, sides 68 and 70 and a face 72 that extends between the opposite ends 64 and 66. While the alignment rib 60 is illustrated as being box-shaped, the alignment rib may have other profiles, such as rounded. Further, the alignment rib 60 is illustrated as having a length L that is of a greater dimension than a width W of the alignment rib 60 providing an elongated shape that extends from the flange 40 to an edge 74 of the shut face panel 32.

Alignment ribs 90 and 92 may be provided at other locations to contact one or both of the flanges 38 and 40. In particular, the alignment rib 90 may be located at the flange 38 to inhibit clockwise rotation of the stopper component 34 and the alignment rib 92 may be located underneath the flange 40 to aid in positioning of the stopper component 34.

Figure 4:
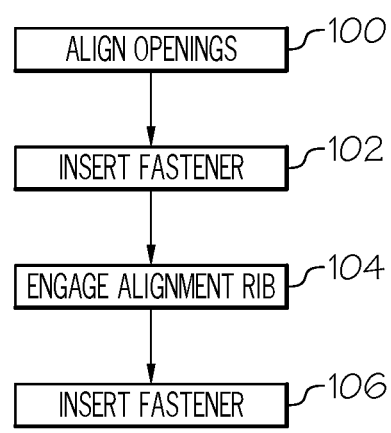
FIG. 4 illustrates a method of installing a vehicle component to a vehicle panel with an alignment rib where the vehicle component abuts against the alignment rib, according to one or more embodiments shown and described herein.

Referring also to FIG. 4, during an installation operation, the fastening openings 46 and 48 of the flanges 38 and 40 are aligned with fastening openings 90 and 92 formed through the shut face panel 32 at step 100. A first fastener may be inserted through the fastening openings 46 and 80 at step 102. At step 104, the flange 40 may be manually supported against the alignment ribs 60, 90 and 92 against ends 64 and 94 of the alignment ribs 60 and 92, as illustrated, as the first fastener is completely tightened, which also aligns the fastening openings 48 and 82 and maintains alignment during the tightening of the first fastener. A second fastener may then be inserted through the fastening openings 48 and 82 at step 106 and completely tightened thereby installing the stopper component 34 to the shut face panel 32.

The above-described vehicle panels with integrally formed alignment ribs can provide a datum location for positioning of a vehicle component as the vehicle component is being installed to the vehicle panels. The alignment ribs may be formed as a monolithic part of the vehicle panels, which can little cost and mass to the vehicle panels. In some embodiments, the alignment ribs have a thickness that is substantially the same as the surrounding vehicle panel thickness (i.e., the alignment rib may be hollow), which can provide the reduced mass compared to a solid alignment rib. The vehicle component abuts against the alignment rib so that the alignment rib inhibits rotation of the vehicle component as a fastener is being tightened. The alignment rib can reduce a number of steps to install the vehicle component, particularly when there is multiple fastening locations.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of installing a stopper component to a shut face panel of a vehicle door assembly, the method comprising:
    aligning a fastening opening of the stopper component with a fastening opening through the shut face panel;
    abutting an outer edge of the stopper component against an alignment rib that is formed integrally with the shut face panel;
    inserting a fastener through the fastening openings of the stopper component and the shut face panel; and
    tightening the fastener while the alignment rib inhibits rotation of the stopper component.

2. The method of claim 1, wherein the stopper component has a first flange and a second flange, the first and second flanges providing fastening locations located at opposite sides of a stopper body.

3. The method of claim 2, wherein the step of abutting the outer edge of the stopper component against the alignment rib comprises abutting the second flange against the alignment rib.

4. The method of claim 3, wherein the fastening opening through the shut face panel is a first fastening opening through the shut face panel and the fastening opening of the stopper component is a first fastening opening through the first flange, the method further comprising aligning a second fastening opening through the second flange with a second fastening opening through the shut face panel.

5. The method of claim 4 further comprising:
    inserting another fastener through the second fastening openings of the second flange and the shut face panel; and tightening the fastener while the alignment rib inhibits rotation of the stopper component.

6. The method of claim 5, wherein the stopper component is the stopper component comprising the stopper body and a bracket that is connected to the stopper body.

7. The method of claim 1 comprising abutting the stopper component against multiple alignment ribs that are formed integrally with the shut face panel.

8. A vehicle comprising:
a vehicle door assembly comprising:
an outer panel;
an inner panel connected to the outer panel;
a shut face panel of the inner panel spans a gap between the outer panel and the inner panel, the shut face panel comprising an alignment rib that is formed integrally with the shut face panel; and
a stopper component that is mounted to the shut face panel using a fastening opening that extends through the shut face panel, the stopper component comprising a fastening opening that is aligned with the fastening opening of the shut face panel with an outer edge of the stopper component abutting against the alignment rib.

9. The vehicle of claim 8, wherein the stopper component has a first flange and a second flange, the first and second flanges providing fastening locations located at opposite sides of a stopper body.

10. The vehicle of claim 9, wherein the second flange abuts against the alignment rib.

11. The vehicle of claim 10, wherein the fastening opening through the shut face panel is a first fastening opening through the shut face panel and the fastening opening of the stopper component is a first fastening opening through the first flange, the shut face panel including a second fastener opening through the shut face panel, a second fastener opening through the second flange is aligned with the second fastening opening of the shut face panel.

12. The vehicle of claim 11, wherein the stopper component comprises the stopper body and a bracket that is connected to the stopper body.

13. The vehicle of claim 8, wherein the shut face panel comprises multiple alignment ribs that are formed integrally with the shut face panel.

* * * * *